United States Patent
Wu et al.

(10) Patent No.: US 8,609,231 B2
(45) Date of Patent: Dec. 17, 2013

(54) COMPOSITE LAMINATES AND USES THEREOF

(75) Inventors: Shaofu Wu, Sugar Land, TX (US); Peter S. Martin, Houston, TX (US); Xuming Chen, Pearland, TX (US); Michelle L. Boven, Midland, MI (US); Weijun Zhou, Lake Jackson, TX (US); Valentina A. Kuznetsova, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 416 days.

(21) Appl. No.: 12/963,172

(22) Filed: Dec. 8, 2010

(65) Prior Publication Data

US 2011/0146792 A1    Jun. 23, 2011

Related U.S. Application Data

(60) Provisional application No. 61/287,469, filed on Dec. 17, 2009.

(51) Int. Cl.
*B32B 7/02* (2006.01)
*B32B 17/06* (2006.01)

(52) U.S. Cl.
USPC ........... 428/215; 428/337; 428/412; 428/421; 428/422; 428/424.2; 428/425.5; 428/441

(58) Field of Classification Search
USPC .............. 428/215, 337, 412, 421, 422, 424.2, 428/425.5, 441
See application file for complete search history.

(56) References Cited

U.S. PATENT DOCUMENTS

| | | |
|---|---|---|
| 3,312,574 A | 4/1967 | Laur |
| 6,159,608 A | 12/2000 | Friedman et al. |
| 6,207,603 B1 | 3/2001 | Danielson et al. |
| 6,287,674 B1 | 9/2001 | Verlinden et al. |
| 6,355,125 B1 | 3/2002 | Tahon et al. |
| 6,689,626 B2 | 2/2004 | Krijn et al. |
| 6,815,070 B1 | 11/2004 | Burkle et al. |
| 7,026,758 B2 | 4/2006 | Guenther et al. |
| 2003/0020321 A1 | 1/2003 | Fitz et al. |
| 2004/0071960 A1 | 4/2004 | Weber et al. |
| 2007/0049155 A1 | 3/2007 | Moro et al. |
| 2010/0062234 A1* | 3/2010 | Murashige et al. ........... 428/213 |
| 2010/0108143 A1* | 5/2010 | Hayes ........................ 136/259 |

FOREIGN PATENT DOCUMENTS

| | | |
|---|---|---|
| GB | 1319846 | 6/1973 |
| JP | 56167731 | 12/1981 |
| WO | 8900500 | 1/1989 |
| WO | 2005110741 A1 | 11/2005 |
| WO | 2008036222 A1 | 3/2008 |
| WO | 2010009017 A1 | 1/2010 |

OTHER PUBLICATIONS

"Introduction of Kureha Extech KF polymer (PVDF) films for photovoltaic applications"; Sep. 2008; Kureha Extech.
Schiller; "Multilayer Technology for Roll-to-Roll Encapsulation"; International Symposium for Electronics on Polymers & Web-Coating Technology; Fraunhofer; Mar. 20-21, 2007; Tokyo.
"Flexible Glass Barrier Engineered Substrate"; Enabling Flexible Display Technologies; 2005; Vitex Systems.

* cited by examiner

*Primary Examiner* — D. S. Nakarani

(57) ABSTRACT

The present invention generally relates to composite laminates and uses thereof in articles in need of protection from mechanical damage and water or oxygen based degradation.

14 Claims, 1 Drawing Sheet

COMPOSITE LAMINATES AND USES THEREOF

CROSS-REFERENCE TO RELATED APPLICATIONS

This application claims benefit from U.S. Provisional Patent Application No. 61/287,469, filed Dec. 17, 2009, the entire contents of which are hereby incorporated herein by reference.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention generally relates to composite laminates and uses thereof in articles in need of protection from mechanical damage and water or oxygen based degradation.

2. Description of the Related Art

Chemical and allied industries have used composite laminates to protect articles sensitive to degradation from degradation-causing conditions. Examples of degradation-causing conditions are exposure to one or more of ultraviolet light; elevated temperatures; atmospheres containing water, oxygen, or both; and mechanical damage. Examples of the sensitive articles needing such protection are electronic devices, including light emitting diodes and photovoltaic cells and modules, which are especially vulnerable when exposed to weather elements such as, for example, hail, wind, rain, and snow. For example, mechanical damage to photovoltaic cells and modules can occur during their manufacture, transportation, installation, and use (e.g., resulting from hail impact, wind, and snow loads). Exposure of photovoltaic cells and modules to moisture and oxygen can corrode metal contacts and interconnects and, for thin-film photovoltaic cells and modules, degrade transparent conductive oxide layers thereof.

In their quest for new composite laminates, skilled artisans have tried many types of materials and constructions thereof from among the vast number and variety of materials and constructions already known to man for forming composite laminates therewith. The skilled artisan must conduct numerous tests on the would-be composite laminates in order to determine whether or not they have desirable properties (e.g., gas or vapor barrier properties and impact resistance) and, hopefully, other important functional properties. Skilled artisans have been overwhelmed by a vast number of choices and property requirements within the field of composite laminates, which makes creating improved composite laminates an unwieldy and unpredictable task.

For example, U.S. Pat. No. 6,815,070 B1 mentions, among other things, a glass-plastic composite film. The glass-plastic composite film consists of a glass film that is between 10 micrometers (μm) and 500 μm thick and a polymer layer with a thickness of between 1 μl and 200 μm, which is applied directly to at least one of the side faces of said film and in that at least one side on the surface of the film has a waviness of less than 100 nanometers (nm) and a roughness $R_T$<30 nm. U.S. Pat. No. 6,815,070 B1 mentions a bewildering number of choices and fails to teach or suggest a glass-plastic composite film having an improved combination of mechanical damage-resistance and water- or oxygen-barrier properties.

In another example, International Patent Application Publication Number WO 2005/110741 A1 mentions, among other things, a process for preparing a composite layered structure comprising a virgin contact-free glass film and a polymer film adhered to the virgin contact-free glass film, the process comprising melting and drawing an inorganic glass material to form a virgin contact-free solid glass film, and applying a polymer film on at least one side of the virgin contact-free glass film. WO 2005/110741 A1 also mentions, among other things, a composite layered material suitable for use in optical display systems comprising a monolithic glass film and a polymer film adhered to at least one side of the glass film, where the glass film has a thickness of less than 20 μm. WO 2005/110741 A1 also mentions, among other things, use of the composite layered material as a barrier layer in optical display systems. WO 2005/110741 A1 also mentions a bewildering number of choices and fails to teach or suggest a composite layered material having an improved combination of mechanical damage-resistance and water- or oxygen-barrier properties.

In still another example, U.S. Pat. No. 6,159,608 mentions, among other things, a thermoplastic interlayer film. Examples 3 and 4 mention rigid glass-polymer film-glass laminates where the glass layers are 3 millimeters thick each and the polymer film can be prepared with a mixture of a polyolefin and vinyltrimethoxysilane or aminopropyltriethoxysilane coupling agent.

In still another example, WO 2008/036222 mentions, among other things, transparent compositions and laminates. Examples mention rigid glass-polymer film-glass laminates where the glass layers are 3 millimeters thick each and the polymer film can be prepared with certain silane-grafted polyolefins.

BRIEF SUMMARY OF THE INVENTION

The inventors recognized that composite laminates preferably have desirable vapor and gas barrier properties and mechanical damage resistance and at the same time satisfy one or more other important functional preferences such as, for example, one or more of toughness, flexibility, light transmittance, weatherability, self-cleaning capability, thermal stability, resistance to oxidation, scratch and mar resistance, and interlayer adhesiveness. The inventors recognized that composite laminates with increased resistance to mechanical damage and water or oxygen based permeation would be valuable. Preferably such composite laminates also would have increased toughness, flexibility (e.g., bending flexibility), light transmittance, weatherability, self-cleaning capability, thermal stability, resistance to oxidation, scratch and mar resistance, or increased interlayer adhesiveness, or a combination of two or more thereof. The composite laminates of the present invention have increased resistance to mechanical damage and increased resistance to permeation by water or oxygen, or both.

In a first embodiment the present invention is an organic polymer-glass laminate comprising, sequentially, a first organic polymer layer, a glass layer, and a first silane-containing polyolefin layer, the glass layer having spaced-apart opposing first and second faces, the first and second faces being spaced-apart by a distance of from 25 micrometers to 500 micrometers; the first organic polymer layer being in direct adhering operative contact to the first face of the glass layer and the first silane-containing polyolefin layer being in direct adhering operative contact to the second face of the glass layer; the organic polymer-glass laminate being characterizable by passing a simulated hail impact test based on standard IEC 1262; and at least one of a water vapor transmission rate through the organic polymer-glass laminate of less than 0.0004 grams of water vapor per square meter of an exposed surface area of the organic polymer-glass laminate per day ($g/m^2/day$) and an oxygen gas transmission rate through the organic polymer-glass laminate of less than 0.0001 cubic centimeters of oxygen gas per (square meter of the exposed surface area, day, bar ($cm^3/(m^2*day*bar)$) (i.e., $cm^3/(m^2*day*100$ kilopascals) or $cm^3/(m^2*day*100$ kPa)).

In a second embodiment the present invention is a sealed glass laminate comprising at least two organic polymer layers and a sealed glass layer, the sealed glass layer comprising a glass having a plurality of microscopic structural defects substantially sealed with a silane-containing polyolefin against transmission of a vapor or gas therethrough, the sealed glass layer having a thickness of from 25 micrometers to 500 micrometers; the sealed glass laminate being characterizable by passing a simulated hail impact test based on standard IEC 1262 and both of a water vapor transmission rate through the sealed glass laminate of less than 0.0004 $g/m^2/day$ and an oxygen gas transmission rate through the sealed glass laminate of less than 0.0001 $cm^3/(m^2*day*bar)$).

In a third embodiment the present invention is a functional laminate comprising a substrate layer disposed between and in direct adhering operative contact to two organic polymer layers, each adhering operative contact to the substrate layer by one of the organic polymer layers independently being characterizable by an adhering strength of 2 Newtons per millimeter (N/mm) or greater, the adhering strength being measured using a 180 degree peel test conducted at a loading rate of 2 inches (51 millimeters) per minute with the functional laminate being at a relative humidity of 50 percent; and a temperature of 24 degrees Celsius (° C.); and the functional laminate being characterizable by:

a total thickness of the substrate and two organic polymer layers of from 75 micrometers to 1500 micrometers;

a water vapor transmission rate through the functional laminate of less than 0.0004 $g/m^2/day$;

an oxygen gas transmission rate through the functional laminate of less than 0.0001 $cm^3/(m^2*day*bar)$;

a light transmittance of at least 80 percent of an incident light through the functional laminate, the incident light being characterizable as having a wavelength of from 380 nanometers to 1200 nanometers; and passing a simulated hail impact test based on standard IEC 1262.

As used herein, the term "adhering" means chemical bonding. The invention contemplates any form of chemical bonding and combinations thereof. The chemical bonding has a measurable strength as determined using a standardized adhering strength test such as, for example, the aforementioned 180 degree peel test.

The term "exposed surface area" means measurement of an extent of an outermost face of an outermost layer of a laminate, the extent being a portion of the outermost face in direct physical contact to a substance.

The term "glass" means a substantially transparent inorganic material that has been solidified from a molten state without crystallizing.

The term "IEC" refers to the International Electrotechnical Commission having its central office in Geneva, Switzerland. The IEC sets international electrical and electronics standards. One such standard is IEC 1262.

The term "laminate" means a multi-layer article comprising at least three sequentially adjacent layers. The laminate will thus have two outermost layers and at least one inner layer in operative contact therewith. The term "face" when referring to a layer of the laminate means a planar surface of the layer, which planar surface is distinct from an edge surface of the layer.

The term "light transmittance" means an amount of a radiant energy transmitted through a given material compared to an amount of a radiant energy incident upon the given material.

The term "microscopic structural defect" means an imperfection that is sealable by the instant silane-containing polyolefin applied thereto and includes, for example, microscopic structural defect apertures. The term "microscopic structural defect aperture" means a non-superficial and non-edge opening through and defined by a glass layer, the opening being between first and second faces of the glass layer and, in an unsealed state allowing gaseous or vaporous communication between the first and second faces of the glass layer via the opening, the opening not being visible to a naked human eye.

The term "operative contact" means, when direct, physically touching and, when indirect, not physically touching but instead physically communicating through at least one interposed material.

The term "organic polymer" means a substance comprising five or more repeat units, each repeat unit independently comprising a residual of at least one monomer, or a derivative thereof, the monomer comprising at least carbon and hydrogen atoms and being capable of being polymerized so as to prepare the substance.

The term "silane-containing polyolefin" means an organic polymer comprising five or more repeat units, each repeat unit independently comprising a residual of an olefin monomer, or a derivative thereof, and a source of alkoxysilane groups, or derivatives thereof.

The term "substantially sealed" means at least 90 percent (%) blocked based on a transmission rate of a given gaseous or vaporous substance through a given blocked material compared to transmission rates for comparable unblocked materials.

The term "total thickness" means a mathematical sum of thicknesses of all layers of a given laminate.

The term "transmission rate" means a quantity of a given gaseous or vaporous substance diffusing through a material having a surface area exposed to the given substance at standard pressure (i.e., 101 kPa) and temperature (24° C.), per a unit of time.

The invention advantageously provides, among other things, composite laminates and articles comprising same. The invention composite laminates include the organic polymer-glass laminate of the first embodiment, sealed glass laminate of the second embodiment, and functional laminate of the third embodiment. For brevity, these are collectively referred to herein as "invention laminates." The invention laminates have a long-sought combination of increased resistance to mechanical damage and increased resistance to water or oxygen based permeation, or both. In many embodiments the invention laminates also have at least one additional improved property. Examples of the additional improved properties are increased toughness, flexibility, light transmittance, weatherability, self-cleaning capability, thermal stability, resistance to oxidation, scratch and mar resistance, and interlayer adhesiveness.

The improved properties of the invention laminates make them especially useful for protecting articles sensitive to mechanical damage and water- or oxygen-based degradation. The invention laminates can be incorporated into articles needing such protection, including articles such as, for example, electronic or optical devices having components or electronic or optical circuitry sensitive to mechanical damage, water based corrosion, oxygen-mediated oxidation, or a combination thereof. Thus the invention laminates are useful for increasing mechanical damage resistance and inhibiting water- and oxygen-based degradation of articles heretofore lacking or having inferior forms of such protection.

Additional embodiments are described in the remainder of the specification, including the claims.

BRIEF DESCRIPTION OF THE DRAWING(S)

Some embodiments of the present invention are described herein in relation to the accompanying drawing(s), which will at least assist in illustrating various features of the embodiments.

DETAILED DESCRIPTION OF THE INVENTION

The present invention relates to composite laminates and uses thereof in articles in need of protection from mechanical damage and water or oxygen based degradation as summarized previously. As described in more detail later, the invention laminates are especially useful for being incorporated into electronic or optical devices, preferably a photovoltaic (PV) cell, PV module comprising an assembly or array of PV cells, or a light emitting diode (LED).

Figure 1:
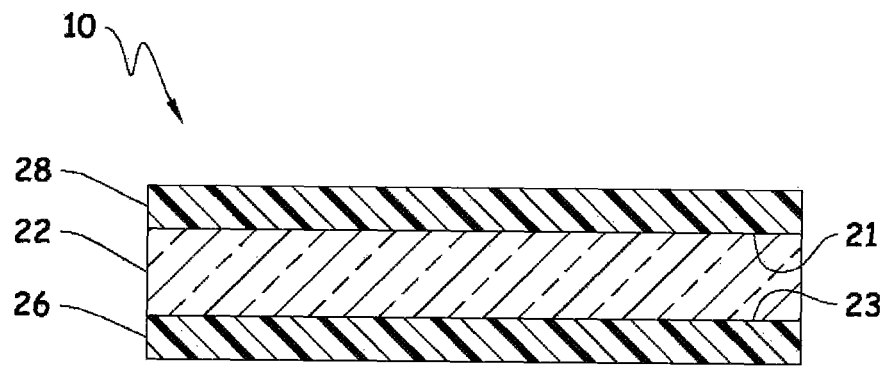
FIG. 1 is an idealized elevation view of a preferred embodiment of the organic polymer-glass laminate.

FIG. 1 shows the idealized edge (elevation) view of a preferred embodiment of the organic polymer-glass laminate. In FIG. 1, organic polymer-glass laminate 10 comprises glass layer 22, first silane-containing polyolefin layer 26, and a first organic polymer layer 28. Glass layer 22 has spaced-apart opposing first and second faces 21 and 23, respectively. First silane-containing polyolefin layer 26 and first organic polymer layer 28 are in adhering operative contact to second and first faces 23 and 21, respectively, of glass layer 22. One can conventionally prepare organic polymer-glass laminate 10 by applying a first silane-containing polyolefin to second face 23 of glass layer 22 and a first organic polymer to first face 21 of glass layer 22 to give a 3-layer sandwich. Laminate the 3-layer sandwich structure degassing it for a period of time (e.g., 5 minutes), heating the degassed sandwich structure to a laminating temperature (e.g., 170° C.), subjecting the resulting heated sandwich structure to a reduced pressure (e.g., 50 kPa gauge pressure) for another period of time (e.g., 5 minutes), and then returning the resulting depressurized sandwich structure to ambient pressure (e.g., 101 kPa) for another period of time (e.g., 10 minutes), and allowing the resulting organic polymer-glass laminate 10 to cool to ambient temperature, thereby preparing organic polymer-glass laminate 10.

Figure 2:
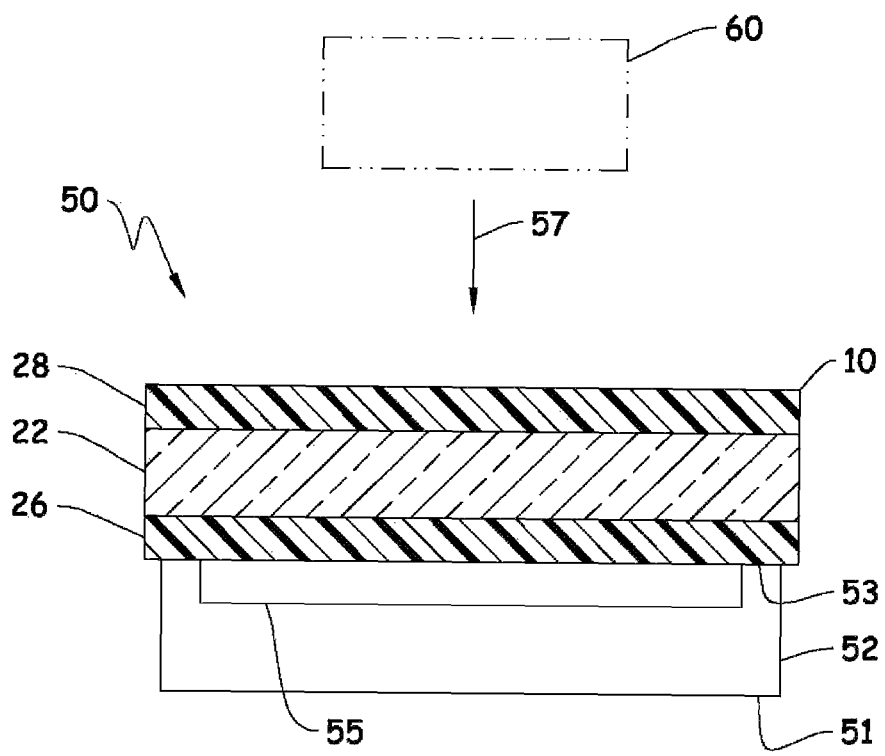
FIG. 2 is an idealized drawing of a preferred embodiment of an invention electronic device comprising a photovoltaic cell and the preferred 3-layer embodiment of the organic polymer-glass laminate of FIG. 1, the electronic device being exposed to a source of mechanical damage, water vapor, and oxygen gas.

FIG. 2 is an idealized edge (elevation) view of a preferred embodiment of an invention electronic device comprising a photovoltaic cell and the preferred 3-layer embodiment of the organic polymer-glass laminate of FIG. 1. In FIG. 2, electronic device 50 comprises photovoltaic cell 52 and organic polymer-glass laminate 10 of FIG. 1. Photovoltaic cell 52 has two substantially planar surfaces 51 and 53 and a sensitive portion 55 in need of protection from mechanical damage and exposure to water vapor and oxygen gas. Substantially planar surface 53 is characterizable as sun-faceable and substantially planar surface 51 as earth-faceable. As described for FIG. 1, organic polymer-glass laminate 10 comprises glass layer 22, first silane-containing polyolefin layer 26, and first organic polymer layer 28. Organic polymer-glass laminate 10 is in direct operative contact with photovoltaic cell 52 in such a way that sensitive portion 55 of photovoltaic cell 52 is protected from mechanical damage and exposure to water vapor and oxygen gas. Also in FIG. 2 is source 60 of mechanical damage, water vapor, and oxygen gas, where the mechanical damage, water vapor, and oxygen gas from source 60 is disposed for impinging first organic polymer layer 28 of organic polymer-glass laminate 10 of electronic device 50 as indicated by arrow 57. Source 60 and arrow 57 are not part of electronic device 50. One can conventionally manufacture electronic device 50 by disposing first silane-containing polyolefin layer 26 portion of organic polymer-glass laminate 10 in direct operative contact with photovoltaic cell 52 (e.g., by urging same against a frame, not shown, as described later).

Preferably in FIGS. 1 and 2, the first organic polymer layer 28 is a second silane-containing polyolefin layer. More preferably the glass layer has a thickness of about 4 mils (100 μm) between first and second faces 21 and 23; the first silane-containing polyolefin layer 26 has a thickness of from 1 mil (25 μm) to 3 mils (75 μm); and the first organic polymer layer 28 is the second silane-containing polyolefin layer having a thickness of from 3 mils (75 μm) to 15 mils (375 μm).

For purposes of United States patent practice and other patent practices allowing incorporation of subject matter by reference, the entire contents—unless otherwise indicated—of each U.S. patent, U.S. patent application, U.S. patent application publication, PCT international patent application and WO publication equivalent thereof, referenced in the instant Summary or Detailed Description of the Invention are hereby incorporated by reference. In an event where there is a conflict between what is written in the present specification and what is written in a patent, patent application, or patent application publication, or a portion thereof that is incorporated by reference, what is written in the present specification controls.

In the present application, any lower limit of a range of numbers, or any preferred lower limit of the range, may be combined with any upper limit of the range, or any preferred upper limit of the range, to define a preferred aspect or embodiment of the range. Each range of numbers includes all numbers, both rational and irrational numbers, subsumed within that range (e.g., the range from about 1 to about 5 includes, for example, 1, 1.5, 2, 2.75, 3, 3.80, 4, and 5).

In an event where there is a conflict between a unit value that is recited without parentheses, e.g., 2 inches, and a corresponding unit value that is parenthetically recited, e.g., (5 centimeters), the unit value recited without parentheses controls.

In the event there is a discrepancy between a chemical name and structure, the structure controls.

As used herein, "a," "an," "the," "at least one," and "one or more" are used interchangeably. In any aspect or embodiment of the instant invention described herein, the term "about" in a phrase referring to a numerical value may be deleted from the phrase to give another aspect or embodiment of the instant invention. In the former aspects or embodiments employing the term "about," meaning of "about" can be construed from context of its use. Preferably "about" means from 90 percent to 100 percent of the numerical value, from 100 percent to 110 percent of the numerical value, or from 90 percent to 110 percent of the numerical value. In any aspect or embodiment of the instant invention described herein, the open-ended terms "comprising," "comprises," and the like (which are synonymous with "including," "having," and "characterized by") may be replaced by the respective partially closed phrases "consisting essentially of," "consists essentially of," and the like or the respective closed phrases "consisting of," "consists of," and the like to give another aspect or embodiment of the instant invention. In the present application, when referring to a preceding list of elements (e.g., ingredients), the phrases "mixture thereof," "combination thereof," and the like mean any two or more, including all, of the listed elements. The term "or" used in a listing of members, unless stated otherwise, refers to the listed members individually as well as in any combination, and supports additional embodiments reciting any one of the individual members (e.g., in an embodiment reciting the phrase "10 percent or more," the "or" supports another embodiment reciting "10 percent" and still another embodiment reciting "more than 10 percent."). The term "optionally" means "with or without." For example, "optionally an additive" means with or without an additive. The term "plurality" means two or more, wherein each plurality is independently selected unless indicated otherwise. The symbols "≤" and "≥" respectively mean less than or equal to and greater than or equal to. The symbols "<" and ">" respectively mean less than and greater than. The symbols "*" and "/" in mathematical expressions respectively mean multiply (multiplied by) and divide (divided by).

As described previously, each of the invention laminates of the first, second, and third embodiments independently comprises at least two organic polymer layers. In the first embodiment, one of the organic polymer layers is the first silane-containing polyolefin layer. In some embodiments the other organic polymers comprise polyolefins. The invention laminates of the first, second, and third embodiments also comprise a glass layer, sealed glass layer, or substrate layer, respectively. Materials comprising each of these layers are described beginning here.

Turning to the silane-containing polyolefins, as described previously the silane-containing polyolefins comprise polyolefins, or derivatives thereof, having alkoxysilane groups, or derivatives thereof, covalently bound thereto. As described later, in some embodiments the alkoxysilane groups are characterizable as being reacted during lamination, or as a result thereof, with functional groups on adjacent layers (e.g., silanol groups on the second face of the glass layer) of the invention laminate to form the derivatives thereof. That is, while the alkoxysilane groups typically are unreacted in the silane-containing polyolefin prior to manufacturing an invention laminate therewith, upon subjecting the silane-containing polyolefin to laminating conditions some of the alkoxysilane groups preferably react with the functional groups on adjacent layers (e.g., glass layer) of the invention laminate.

Each of the silane-containing polyolefins useful in the practice of this invention can be any silane-containing polyolefin, or a blend of two or more silane-containing polyolefins. The invention contemplates using all forms of silane-containing polyolefins, including random interpolymers and block interpolymers (e.g., silane-containing olefin block copolymers).

The silane-containing polyolefins and polyolefin-containing organic polymers useful in the practice of this invention can be described here in terms of their polyolefin portions and, for the silane-containing polyolefins, their alkoxysilane group portions.

Regarding types of polyolefins, preferably each polyolefin-containing organic polymer and silane-containing polyolefin is based on a corresponding polyolefin copolymer. In some embodiments the polyolefin copolymers useful in the practice of this invention typically have, before grafting, a density of less than 0.91 grams per milliliter (g/mL), preferably less than 0.905 g/mL, more preferably less than 0.89 g/mL, even more preferably less than 0.88 g/mL, and even more preferably less than 0.875 g/mL. The polyolefin copolymers typically have a density greater than 0.85 g/mL, preferably greater than 0.855 g/mL, and more preferably greater than 0.86 g/mL. Density is measured by the procedure of ASTM D-792. These low density polyolefin copolymers are generally characterized as being semi-crystalline, flexible and having good optical properties, e.g., high transmission of visible and UV-light and low haze.

In some embodiments the polyolefin copolymers useful in the practice of this invention typically have, before grafting, a melt index greater than 0.10 gram per 10 minutes (g/10 minutes), and preferably greater than 1 g/10 minutes. The polyolefin copolymers typically have a melt index of less than 75 g/10 minutes, and preferably of less than 10 g/10 minutes. Melt index is measured by the procedure of ASTM D-1238 (190° C./2.16 kilograms (kg)).

In some embodiments the polyolefin copolymers useful in the practice of this invention are made with a single site catalyst such as a metallocene catalyst or constrained geometry catalyst and typically have, before grafting, a melting point of less than about 95° C., preferably less than about 90° C., more preferably less than about 85° C., even more preferably less than about 80° C., and still more preferably less than about 75° C. In some embodiments the polyolefin copolymers are made with multi-site catalysts, e.g., Ziegler-Natta and Phillips catalysts, and have a melting point that is typically 125° C. to 127° C. The melting point is measured by differential scanning calorimetry (DSC) as described, for example, in U.S. Pat. No. 5,783,638. Polyolefin copolymers with a low melting point often exhibit desirable flexibility and thermoplasticity properties useful in the fabrication of the invention laminates.

Preferably the polyolefin copolymers useful in the practice of this invention include ethylene/alpha-olefin interpolymers having an alpha-olefin (α-olefin) content of between about 15 weight percent (wt %), preferably at least about 20 wt %, and even more preferably at least about 25 wt %, all based on the weight of the ethylene/alpha-olefin interpolymer. These ethylene/alpha-olefin interpolymers typically have an α-olefin content of less than about 50 wt %, preferably less than about 45 wt %, more preferably less than about 40 wt %, and even more preferably less than about 35 wt %, all based on the weight of the ethylene/alpha-olefin interpolymer. The α-olefin content is measured by carbon-13 ($^{13}$C) nuclear magnetic resonance (NMR) spectroscopy using the procedure described in Randall (*Rev. Macromol. Chem. Phys., C29* (2&3)). Generally, the greater the α-olefin contents of the ethylene/alpha-olefin interpolymer, the lower the density and the more amorphous the ethylene/alpha-olefin interpolymer.

The α-olefin of the ethylene/alpha-olefin interpolymer is preferably a ($C_3$-$C_{20}$)-linear, -branched or -cyclic α-olefin, that is a linear, branched, or cyclic α-olefin having from 3 to 20 carbon atoms. Examples of $(C_3-C_{20})$-α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, providing α-olefins such as 3-cyclohexyl-1-propene (i.e., allyl cyclohexane) and vinyl cyclohexane.

In some embodiments the polyolefin copolymers useful in the practice of this invention include ethylene/cyclic olefins. Preferred cyclic olefins are norbornene and related cyclic olefins. The cyclic olefins can be used in place of some or all of the α-olefins described above for purposes of this invention Similarly in some embodiments the polyolefin copolymers include ethylene/aromatic olefins. Preferred aromatic olefins are styrene and its related olefins (for example, α-methylstyrene). The aromatic olefins can be used in place of some or all of the α-olefins described above for purposes of this invention. Acrylic and methacrylic acid and their respective ionomers, and acrylates and methacrylates, however, are not contemplated for use in this invention.

Illustrative polyolefin copolymers useful in the practice of this invention include ethylene/propylene, ethylene/butene, ethylene/1-hexene, ethylene/1-octene, ethylene/styrene, and the like. Ethylene/acrylic acid (EAA), ethylene/methacrylic acid (EMA), ethylene/acrylate or methacrylate, ethylene/vinyl acetate and the like are not polyolefin copolymers of this invention. Illustrative terpolymers include ethylene/propylene/1-octene, ethylene/propylene/butene, ethylene/butene/1-octene, and ethylene/butene/styrene.

More specific examples of olefinic interpolymers useful in the practice of this invention include very low density polyethylene (VLDPE) (e.g., FLEXOMER® ethylene/1-hexene polyethylene made by The Dow Chemical Company), homogeneously branched, linear ethylene/α-olefin copolymers (e.g. TAFMER® by Mitsui Petrochemicals Company Limited and EXACT® by Exxon Chemical Company), and still more preferably homogeneously branched, substantially linear ethylene/α-olefin copolymers (e.g., AFFINITY® and ENGAGE® polyethylene available from The Dow Chemical Company), and olefin block copolymers such as those described in U.S. Pat. No. 7,355,089 (e.g., INFUSE® available from The Dow Chemical Company). The more preferred polyolefin copolymers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

The polyolefin copolymers useful in the practice of this invention also include propylene, butene and other alkene-based polyolefin copolymers, e.g., polyolefin copolymers comprising a majority of units derived from propylene and a minority of units derived from another α-olefin (including ethylene). Exemplary propylene polymers useful in the practice of this invention include the VERSIFY® polymers available from The Dow Chemical Company, and the VISTAMAXX® polymers available from ExxonMobil Chemical Company.

Blends of any of the above olefin interpolymers (also referred to as polyolefin interpolymers) can also be used in this invention, and the olefin interpolymers can be blended or diluted with one or more other organic polymers to the extent that the polymers are (i) miscible with one another, (ii) the other polymers have little, if any, impact on the desirable properties of the polyolefin interpolymer, e.g., optics and low modulus, and (iii) the polyolefin interpolymers useful in this invention constitute at least about 70 wt %, preferably at least about 75 wt %, and more preferably at least about 80 wt % of the blend, all based on weight of the blend.

Turning to the source of the alkoxysilane groups useful in the silane-containing polyolefins, the source of alkoxysilane groups can be where the alkoxy silane groups have been introduced via copolymerizing a mixture of at least one olefin monomer and at least one alkoxysilane monomer (that is the silane-containing polyolefin is a poly(olefin alkoxysilane) to give a silane-containing polyolefin comprising at least 5 repeat units, each repeat unit comprising a residual in such a way that the silane-containing polyolefin comprises residuals of at least one olefin monomer and at least alkoxysilane monomer). Alternatively, the alkoxysilane groups have been covalently bound (i.e., grafted) to the repeat units comprising residuals of the at least one olefin monomer (i.e., the silane-containing polyolefin is a silane-grafted polyolefin). The present invention also contemplates combinations of such sources of alkoxysilane groups.

Regarding the silane-grafted polyolefins, any alkoxysilane that will effectively graft to the polyolefin (e.g., to a backbone of the polyolefin) and lead to adhesion to glass can be used in the practice of this invention. Suitable alkoxysilanes include unsaturated alkoxysilanes that comprise an ethylenically unsaturated hydrocarbyl group, such as a vinyl, allyl, isopropenyl, butenyl, cyclohexenyl, or (-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkylamino, and arylamino groups. Preferred alkoxysilanes are the unsaturated alkoxysilanes which can be grafted onto the polyolefin. These alkoxysilanes and their method of preparation are more fully described in U.S. Pat. No. 5,266,627. Vinyl trimethoxy silane, vinyl triethoxy silane, acryloxy propyl trimethoxy silane, methacryloxy propyl trimethoxy silane, and mixtures of these alkoxysilanes are the preferred for is use in this invention.

Regarding the poly(olefin alkoxysilanes), examples include SILINK™ poly(ethylene-co-vinyltrimethoxysilane) copolymer, which can be used in place of or in combination with silane-containing polyolefins grafted or otherwise modified with alkoxysilane groups.

Amounts of alkoxysilane groups in the silane-containing polyolefins can vary depending upon, for example, the nature of the polyolefin or alkoxysilane, the processing conditions, grafting efficiency, the ultimate application, and similar factors. The amount of alkoxysilane groups can be determined by a person of ordinary skill in the art without undue experimentation. Typically the amount of alkoxysilane groups in the silane-containing polyolefin is at least 0.2 wt %, and more preferably at least 0.5 wt %, all based on the weight of the alkoxysilane-containing polyolefin. Considerations of convenience and economy are usually two principal limitations on the maximum amount of alkoxysilane groups in the silane-containing polyolefin. Typically a maximum amount of alkoxysilane groups in the silane-containing polyolefin does not exceed 5 wt %, and more preferably it does not exceed 3 wt %, all based on the weight of the alkoxysilane-containing polyolefin. In some embodiments, weight percent of alkoxysilane groups in the silane-containing polyolefin are from 4 wt % to 5 wt %. In some embodiments, weight percent of alkoxysilane groups in the silane-containing polyolefin are from 3 wt % to 5 wt %. In some embodiments, weight percent of alkoxysilane groups in the silane-containing polyolefin are from 0.1 wt % to 4 wt %, more preferably from 0.5 wt % to 2 wt %, and still more preferably from 1 wt % to 2 wt %.

In those embodiments comprising two or more layers of silane-containing polyolefin, the amount of alkoxysilane groups in each layer can be the same or different, and each layer can contain the same or different silane-containing polyolefin. As an example, in the first silane-containing polyolefin layer, the polyolefin thereof is grafted with vinyl trimethoxy silane while in a second silane-containing polyolefin layer a same or different polyolefin thereof is grafted with vinyl ethoxy silane, or vice versa. Or in the first silane-containing polyolefin layer the polyolefin is grafted with vinyl methoxy silane while the second silane-containing polyolefin layer comprises a poly(ethylene-co-vinyltrimethoxysilane) copolymer. In some embodiments, the amount of alkoxysilane groups in one of the first and second silane-containing polyolefin layers is at least two times, three times, or four-times as much the amount of the alkoxysilane groups in the other one of the first and second silane-containing polyolefin layers.

The alkoxysilane groups can be grafted to a polyolefin to prepare silane-grafted polyolefin embodiments of the silane-containing polyolefin. The grafting can be by any conventional method, typically is performed in the presence of a free radical initiator, e.g., peroxides and azo compounds, or by ionizing radiation. Organic free radical initiators are preferred, and more preferred are peroxide free radical initiators. Examples of useful peroxide free radical initiators are dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. The term "tert" and "t-" means tertiary. A suitable azo compound is azobisisobutyl nitrile. The amount of free radical initiator can vary, but it is typically present in an amount of at least 0.02 parts per hundred polyolefin resin (phr), and more preferably at least 0.03 phr. Typically, the free radical initiator does not exceed 0.15 phr, and more preferably it does not exceed about 0.10 phr. The molar ratio of alkoxysilane group to free radical initiator also can vary widely, but a typical alkoxysilane:free radical initiator ratio is between 10:1 to 150:1, and more preferably between 18:1 and 100:1.

While any conventional method can be used to graft the alkoxysilane group to the polyolefin, one preferred method is melt blending an alkoxysilane and polyolefin with the free radical initiator in the first stage of a reactor extruder, such as a Buss kneader. The grafting conditions can vary, but temperatures of the melt are typically between 160° C. and 260° C., and more preferably between 190° C. and 230° C., depending upon residence time and half life of the free radical initiator.

Turning to the organic polymers other than the silane-containing polyolefins, any organic polymer, including the aforementioned polyolefins, can be used provided direct and sufficient adhering operative contact with immediately adjacent layers for intended uses can be achieved. Each of the organic polymers can be any organic polymer, or a blend of two or more organic polymers. Examples of suitable organic polymers are homopolymers and interpolymers, including copolymers, terpolymers, tetrapolymers, et cetera. The invention contemplates using all forms of interpolymers, including random interpolymers and block interpolymers (e.g., olefin block interpolymers). For applications requiring light transparency, examples of preferred organic polymers are polycarbonates; polyesters (e.g., poly(ethylene terephthalate) (PET), vinyl ester, and polyethylene naphthalate (PEN)); acrylics; polyacrylates (e.g., polymethyl methacrylates (PMMA)); amorphous polyolefins; cyclic polyolefin copolymers (e.g., styrene/1,3-butadiene and others described previously), especially a cyclic block copolymer (CBC) polyolefin; polystyrenes (e.g., those prepared with metallocene-catalyzed styrene monomers); epoxy; nylons; fluoropolymers; silicones; aliphatic thermoplastic polyurethanes; and blends of two or more of these organic polymers. The organic polymers more preferably are characterizable as having light transmittance of at least 80 percent of an incident light through a layer of the organic polymer, the incident light being characterizable as having a wavelength of from 380 nanometers to 1200 nanometers; scratch resistance; mar resistance; and water barrier properties. Preferably the organic polymer of the first organic polymer layer comprises a thermoplastic, glass adhering material, where adhering strength of the organic polymer to glass is 2 N/mm or greater, the adhering strength being measured using the 180 degree peel test conducted at a loading rate of 2 inches (51 millimeters) per minute with the functional laminate being at a relative humidity of 50 percent; and a temperature of 24° C. Examples of preferred organic polymers useful for the first organic polymer layer are silicones, silane-containing polyolefins, and blends thereof. More preferably the organic polymer of the first organic polymer layer comprises the silane-containing polyolefin. For a reinforcing layer, preferred is an organic polymer comprising the cyclic block copolymer. A reinforcing layer is preferred in the invention laminates where additional protection from mechanical damage, a stiffening layer (e.g., to inhibit over-bending of the invention laminates), or both, is desirable. For a material comprising a protecting layer, preferred is an organic polymer comprising a silicone, or more preferably, a fluoropolymer. Preferred fluoropolymers are, e.g., poly(ethylene-co-tetrafluoroethylene) (ETFE); polyvinylidene fluoride (PVDF); and fluorinated ethylene propylene (FEP). A protecting layer is preferred as an outermost layer in the invention laminates, which outermost layer can be in direct contact with the aforementioned degrading conditions or performance inhibiting conditions. Examples of performance inhibiting conditions include, for example, dirt pickup (e.g., to impart a self-cleaning capability to a photovoltaic module) or a low sunlight contact angle (e.g., to impart increased light-to-electricity efficiency to a photovoltaic module, especially for use in northern latitudes).

The organic polymers can further comprise additives. The invention contemplates employing additives where it is desirable to enhance or attenuate a performance property or degradation-resistance property of the invention laminates. Examples of suitable additives are ultraviolet light (UV)-absorbents, UV-stabilizers, processing stabilizers, antioxidants, cling additives, anti-blocks, anti-slips, pigments, fillers, and in-process additives. Preferred UV-stabilizers are useful in absorbing shorter wavelengths of electromagnetic radiation that otherwise could be slowly damaging to the invention laminates (e.g., invention laminates in a PV module), thereby inhibiting UV-based degradation thereof. Preferred lowered wavelengths are less than 360 nm. Examples of suitable UV-absorbers are hindered phenols such as CYASORB UV 531 (2-hydroxy-4-octoxybenzophenone available from Cytec Industries Inc., Wilmington, Del., USA) and hindered amines. The amount of UV-absorbent is typically from about 0.1 wt % to 0.8 wt %, more preferably from about 0.1 wt % to 0.5 wt %, and still more preferably from 0.2 wt % to 0.3 wt %, all based on weight of the organic polymer. An example of a suitable UV-stabilizer is CHIMASSORB 944 LD (poly[[6-[1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]]) available from Ciba Corporation, Tarrytown, N.Y., USA). The amount of UV-stabilizer is typically from about 0.02 wt % to 0.5 wt %, and more preferably from about 0.05 wt % to 0.15 wt, all based on weight of the organic polymer. Preferred processing stabilizers are trivalent phosphorus compounds. Examples of suitable phosphorus compounds include phosphonites and phosphites. The amount of processing stabilizer, including phosphorous compounds, is typically from about 0.02 wt % to 0.5 wt %, and preferably from about 0.05 wt % to 0.15 wt %, all based on weight of the organic polymer. Examples of suitable antioxidants are hindered phenolics such as IRGANOX® 1010 (pentaerythritol tetrakis(3-(3,5-di-tert-butyl-4-hydroxyphenyl)propionate made by Ciba Geigy). The amount of antioxidant is typically from about 0.02 wt % to 0.5 wt %, and more preferably from about 0.05 wt % to 0.15 wt %, all based on weight of the organic polymer. An example of a suitable cling additive is polyisobutylene. Examples of suitable fillers are clear fillers, which are preferred where transparency is important such as in photovoltaic devices. Examples of in-process additives are calcium stearate, water, and phosphite. These and other potential additives are used in the manner and amount as is commonly known in the art.

Turning to the glass of the glass layer, many types of glass can be used. Examples of suitable glass are glass known for use in windows, many bottles, or eyewear, including, but not limited to, soda-lime glass, borosilicate glass, acrylic glass, sugar glass, isinglass (Muscovy-glass), and aluminum oxynitride. Many suitable glasses contain silica as their main component and a minor component that is a glass former.

Pure silicon dioxide ($SiO_2$) glass (the same chemical compound as quartz, or, in its polycrystalline form, sand) does not absorb UV light and is used for applications that require transparency in this region. Such applications include, for example, photovoltaic cells and organic light emitting diodes. Large natural single crystals of quartz are essentially pure silicon dioxide, and upon crushing can be used for preparing high quality specialty glasses. Synthetic amorphous silica, an almost 100% pure form of quartz, is the raw material for many specialty glasses.

Preferably the glass used in the present invention is a window glass; plate glass; silicate glass; sheet glass; float glass; colored glass; specialty glass; glass coated with a sputtered metal such as silver; glass coated with antimony tin oxide, indium tin oxide, or both; E-glass; SOLEX™ glass (available from PPG Industries of Pittsburgh, Pa., USA) and TOROGLASS™ (North American Specialty Glass, LLC, New York, N.Y., USA). The specialty glass can include ingredients to control solar heating thereof.

The glass typically is characterizable as having a plurality of microscopic structural defects such as, for example, microscopic scratches, pinholes and cracks. Gaseous and vaporous substances such as water vapor and oxygen gas can undesirably diffuse through the glass via these microscopic structural defects. The higher the number and greater the average diameter of the microscopic structural defects, especially microscopic structural defect apertures, in the glass, the higher the transmission rate of the gaseous or vaporous substance through the glass. The silane-containing polyolefin, when effectively applied to a surface of the glass (e.g., one or both faces of the glass layer), effectively seals the microscopic structural defects, thereby forming the sealed glass laminate of the third embodiment. The silane-containing polyolefin does not have to coat a surface of the glass to achieve the sealing effect provided that the silane-containing polyolefin at least enters and effectively blocks interior portions of the microscopic pinholes, cracks, and the like in the glass. In some embodiments, the silane-containing polyolefin is disposed in interior portions of the microscopic pinholes, cracks, and the like and does not comprise a coating on a surface of the glass. In some embodiments, the silane-containing polyolefin is disposed only as a coating of a surface of the glass. In some embodiments, the silane-containing polyolefin is disposed in interior portions of the microscopic pinholes, cracks, and the like and comprises a coating of a surface of the glass.

Turning to constructions of the invention laminates, preferably immediately adjacent layers of each of the invention laminates independently are in direct adhering operative contact to each other, typically via chemical bonds between opposing facial surfaces (interfacial surfaces) thereof. A silane-containing polyolefin layer that is in direct adhering operative contact to the glass layer, sealed glass layer, or substrate layer can be linked (i.e., bonded) to the glass layer, sealed glass layer, or substrate layer via reaction with silanol groups on an interfacial surface of the glass or sealed glass layer or other functional groups on an interfacial surface of the substrate layer.

The silane-containing polyolefin of each silane-containing polyolefin layer that is in direct adhering operative contact to the glass layer, sealed glass layer, or substrate layer substantially lacks cross-linking (e.g., Lewis acid-catalyzed cross-linking) therein. Without wishing to be bound by theory, polyolefins that contain trialkoxysilane groups will detrimentally react with water in the presence of a catalyst to form silanol functional groups, and these silanol groups will detrimentally further react with each other, also in the presence of a catalyst, to form unwanted siloxane cross-links. Each of these two reactions occurs very slowly or not at all under standard or laminating conditions in absence of the catalyst (e.g., base or acid, e.g., Lewis acid). While the resulting cross-linked silane-containing polyolefin would have satisfactory mechanical strength, it would undesirably exhibit unsatisfactory adhesion to glass. This is because some of the alkoxysilane groups on the surface of the silane-containing polyolefin layer that are required for reaction with the silanol groups on a glass surface would have been converted to the siloxane cross-link groups, and siloxane cross-link groups are not reactive with the glass surface.

This is why the silane-containing polyolefin of each silane-containing polyolefin layer that is in direct adhering operative contact to the glass layer, sealed glass layer, or substrate layer substantially lacks cross-linking (e.g., Lewis acid-catalyzed cross-linking) therein. Presence of the instant direct adhering operative contact as measured using, for example, the 180 degree peel test indicates the substantial lack of cross-linked groups therein. Another test for determining whether or not the silane-containing polyolefin substantially lacks cross-linking is a gel content, as measured by ASTM D-2765. Preferably the gel content for the invention laminates is less than 40, preferably less than 30, more preferably less than 20, still more preferably less than 10, and even more preferably less than 5.

In addition to the aforementioned layers, in some embodiments the invention laminates further comprise one or more additional organic polymer layers so as to provide invention laminates having 4 or more layers. Each organic polymer layer, whether an additional layer or not, independently comprises a silane-containing polyolefin or a material other than a silane-containing polyolefin. In some embodiments one, and more preferably, each of the organic polymer layers (e.g., the first organic polymer layer of the organic polymer-glass laminate) independently comprises a protecting layer or reinforcing layer, the protecting layer or reinforcing layer comprising a material other than a silane-containing polyolefin.

Where the invention laminates comprise two or more organic polymer layers (one of the organic polymer layers of the organic polymer-glass laminate of the first embodiment is the silane-containing polyolefin layer) or two or more silane-containing polyolefin layers, the prefixes first, second, et cetera can be used herein to conveniently distinguish between them. For example, the organic polymer-glass laminate comprises, among other things, the first organic polymer layer and the first silane-containing polyolefin layer. In some embodiments the organic polymer-glass laminate further comprises a second organic polymer layer, the second organic polymer layer being in direct adhering operative contact to the first organic polymer layer or first silane-containing polyolefin layer. In some embodiments the second organic polymer layer is in direct adhering operative contact to the first silane-containing polyolefin layer. In some embodiments the second organic polymer layer is in direct adhering operative contact to the first organic polymer layer. In some embodiments the organic polymer-glass laminate further comprises a third organic polymer layer, the third organic polymer layer being in direct adhering operative contact to the first silane-containing polyolefin layer and the second organic polymer layer comprising a protecting layer or reinforcing layer and being in direct adhering operative contact to the first organic polymer layer. In some embodiments the organic polymer-glass laminate further comprises both the second and third organic polymer layers.

In some embodiments the first organic polymer layer comprises a second silane-containing polyolefin layer, the second silane-containing polyolefin layer being in direct adhering operative contact to the first face of the glass layer, the organic polymer-glass laminate thereby comprising, sequentially, the second silane-containing polyolefin layer, glass layer, and first silane-containing polyolefin layer. The first and second silane-containing polyolefin layers each independently exhibit acceptable adhesion to the glass layer.

Invention laminates comprising 4 or more layers can be described as having inner and outer organic polymer layers, the inner and outer organic polymer layers being relative to the glass layer, sealed glass layer, or substrate layer of the respective invention laminates of the first, second, and third embodiments. Preferably inner organic polymer layers have a tensile modulus less than or equal to a tensile modulus of outer organic polymer layers. In some embodiments the first organic polymer layer is characterizable by a tensile modulus less than or equal to tensile shear modulus of the second organic polymer layer. In some embodiments the first silane-containing polyolefin layer is characterizable by a tensile modulus less than or equal to a tensile modulus of the third organic polymer layer. Tensile modulus testing is well known in the polymer art.

In some embodiments, each of the invention laminates independently consists of 3 layers, the three layers being, of course, the first organic polymer layer, glass layer, and first silane-containing polyolefin layer. In some embodiments, each of the invention laminates independently consists of 4 layers, the aforementioned 3 layers plus 1 additional layer. In some embodiments, each of the invention laminates independently consists of 5 layers, the aforementioned 3 layers plus 2 additional layers. In some embodiments, each of the invention laminates independently consists of 10 layers or less, the aforementioned 3 layers plus up to 7 additional layers. In some embodiments, each of the invention laminates independently consists of 7 layers or less, the aforementioned 3 layers plus up to 4 additional layers. In some embodiments at least one, preferably two, and more preferably each of the additional layers independently are the second or third organic polymer layer as described herein. In some embodiments at least one of the additional layers independently is a layer other than the second or third organic polymer layer as described herein (e.g., is a second glass layer).

In some embodiments each of the invention laminates independently is characterizable by a total thickness of from 75 micrometers ($\mu m$) to 2500 $\mu m$, and more preferably from 75 $\mu m$ to 1500 $\mu m$, all depending on how many layers make up each of the invention laminates and thickness of each layer. In some embodiments the total thickness is 900 $\mu m$ or less; more preferably 850 $\mu m$ or less, and still more preferably 575 $\mu m$ or less. In some embodiments the total thickness is 150 $\mu m$ or greater; more preferably 175 $\mu m$ or greater, and still more preferably 250 $\mu m$ or greater. In some embodiments the silane-containing polyolefin is employed as a tie layer between the glass layer, sealed glass layer, or substrate layer and an organic polymer layer comprising an organic polymer that is not a silane-containing polyolefin. Such tie layers typically are from about 50 $\mu m$ to 100 $\mu m$ thick (e.g., 75 $\mu m$). In some embodiments the silane-containing polyolefin is employed as a reinforcing layer. Such reinforcing layers typically are from about 100 $\mu m$ to 400 $\mu m$ thick (e.g., 375 $\mu m$).

In some embodiments thickness of the glass layer or sealed glass layer independently is from 25 $\mu m$ to 500 $\mu m$, preferably from 50 $\mu m$ to 250 $\mu m$, more preferably from 50 $\mu m$ to 200 $\mu m$, and still more preferably from 100 $\mu m$ to 200 $\mu m$. In some embodiments thickness of the glass layer or sealed glass layer independently is from 40 $\mu m$ to 120 $\mu m$ and more preferably from 50 $\mu m$ to 100 $\mu m$. In some embodiments thickness of the glass layer or sealed glass layer independently is from greater than 250 $\mu m$ to 500 $\mu m$. Preferably, thickness of the silane-containing polyolefin layer is from 10 $\mu m$ to 500 $\mu m$, more preferably from 20 $\mu m$ to 375 $\mu m$, still more preferably from 25 $\mu m$ to 250 $\mu m$, and even more preferably 25 $\mu m$ to 200 $\mu m$. Preferably, thickness of the organic polymer layer that independently is the reinforcing layer (e.g., cyclic olefin block copolymer polyolefin) is from 25 $\mu m$ to 500 $\mu m$, and more preferably from 75 $\mu m$ to 200 $\mu m$. Preferably, thickness of the organic polymer layer that independently is the protecting layer (e.g., fluoropolymer) is from 1 $\mu m$ to 125 $\mu m$, and more preferably from 10 $\mu m$ to 75 $\mu m$. As generally taught previously, a lower limit of one thickness range can be combined with an upper limit of another thickness range so as to provide a yet more preferred thickness range.

Each layer of each of the invention laminates independently is characterizable as having at least one edge surface and two planar surfaces. The two planar surfaces (i.e., first and second faces) of a layer are "spaced apart" from each other by a distance equal to a thickness of the layer and oppose each other, that is are approximately parallel to each other. A circular-shaped layer can be characterized as having one continuous edge. A square- or rectangular-shaped layer can be characterized as having four edges. Preferably the layers of the invention laminates other than the glass layer, sealed glass layer, or substrate layer extend to, or more preferably slightly beyond the at least one edge, and preferably all edges, of the glass layer, sealed glass layer, or substrate layer. Where the first organic polymer layer and silane-containing polyolefin layer extend to, or beyond, the at least one edge of the glass layer, they are more preferably in direct adhering operative contact to entire first and second faces of the glass layer, respectively. In some embodiments the invention laminate further comprise an encapsulating layer, which envelops and surrounds at least edge(s), and preferably all of the invention laminate. Examples of materials suitable for use as the encapsulating layer are poly(ethylene-co-vinyl acetate) (EVA), poly(ethylene terephthalate), and poly(styrene 1,3-butadiene) cyclic block copolymer.

Turning to the organic polymer-glass laminate of the first embodiment in particular, in some embodiments the first organic polymer layer is the second silane-containing polyolefin layer and has a thickness of from 75 micrometers to 375 micrometers and the first silane-containing polyolefin layer has a thickness of from 25 micrometers to 75 micrometers. Preferably this organic polymer-glass laminate comprises a mechanical damage-resistance and vapor and gas barrier portion of an electronic or optical device; the first silane-containing polyolefin layer a thickness of from 25 micrometers to 75 micrometers and is disposed nearer a portion of the electronic or optical device in need of protection from mechanical damage, water vapor, and oxygen gas than is disposed the glass layer; and the second silane-containing polyolefin layer has a thickness of from 75 micrometers to 375 micrometers and is disposed farther from the portion of the electronic or optical device in need of the protection than is disposed the glass layer. More preferably, the first silane-containing polyolefin layer consists of the only layer (other than an optional encapsulating layer) disposed between the glass layer and the portion of the electronic or optical device in need of the protection.

In some embodiments the glass layer of the organic polymer-glass laminate is replaced by a sheet of a rigid or flexible, organic polymer material. The sheet comprises a polycarbonate, an acrylic, a polyacrylate, a cyclic polyolefin such as ethylene norbornene, polystyrene prepared by catalyzing polymerization of one or more styrene monomers with a metallocene catalyst; and mixtures of two or more of these sheet materials.

Turning to the sealed glass laminate of the second embodiment and functional laminate of the third embodiment in particular, preferably at least one of the organic polymer layers of the sealed glass laminate and functional laminate independently comprises a silane-containing polyolefin. More preferably the sealed glass laminate flexible is further characterizable as flexible as determined by a two-point bending test, the flexibility being characterizable as an average measured or calculated bending curvature in millimeters from extension at break using the two-point bending test, wherein the measured or calculated average bending curvature is 500 mm or less, and more preferably less than 200 mm. In some embodiments the bending curvature is measured. In some embodiments the bending curvature is calculated.

Turning to the functional laminate in particular, in some embodiments the functional laminate comprises the organic polymer-glass composite laminate of the first embodiment. Thus the substrate layer of the functional laminate is the glass layer of the organic polymer-glass composite laminate in some embodiments or the sheet of a rigid or flexible, organic polymer material of the organic polymer-glass composite laminate in other embodiments. In other embodiments the functional laminate does not comprise the organic polymer-glass composite laminate of the first embodiment. Preferably the substrate layer of the functional laminate comprises the glass layer as described for the first embodiment or the sealed glass laminate layer as described for the second embodiment.

Turning to manufacture of the invention laminates, the invention laminates can be manufactured by any suitable laminating method and under any suitable laminating conditions. Each organic polymer layer of the invention laminates can be extruded, calendered, solution cast, injection molded, or otherwise applied to (placed in contact with) a surface of an immediately adjacent layer. In an illustrative lamination process, the first organic polymer layer is applied to the first face of the glass layer of the organic polymer-glass laminate of the first embodiment, and the first silane-containing polyolefin layer is applied to the second face of the glass layer so as to form a three-layer sandwich structure. Optionally, any second and third organic polymer layers can be applied to the aforementioned first organic polymer layer or first silane-containing polyolefin layer so as to form a four- or five-layer sandwich structure. Then the three, four, or five layer sandwich structure is laminated under conventional laminating conditions, preferably under conventional vacuum laminating conditions, so as to form a three, four, or five layer organic polymer-glass laminate of the first embodiment. Total thickness of the resulting invention laminate is equal to total thickness the layered sandwich structure (precursor) used to prepare same is equal to a sum of thicknesses of individual layers of the layered sandwich structure. An example of suitable laminating conditions are degassing the three, four, or five layer sandwich structure for 5 minutes, heating the degassed sandwich structure to about 150° C., subjecting the resulting heated sandwich structure to a reduced pressure of about one half atmospheric pressure (e.g., 50 kPa gauge pressure) for 2 minutes, and then returning the resulting depressurized sandwich structure to atmospheric pressure (e.g., 101 kPa) for 10 minutes, and allowing the resulting three, four, or five layer organic polymer-glass laminate, respectively, to cool to room temperature. Preferably the method of manufacturing the invention laminates further employs one or more removable cover sheets (e.g., a sheet of paper (e.g., white laser or inkjet printer paper or photocopier paper), tulle, or silk), each removable cover sheet being in contact with a face of at least one layer being used to prepare the sandwich structure. The removable cover sheets can be provided as part of a commercially available glass layer or polymer film or can be added separately thereto. A primary purpose of the removable cover sheets is to protect each of the layers during assembly of the sandwich structure from marring, premature adhering to another layer, or other possible layer defect-causing events, and in some embodiments also to add a measure of support for each ease of handling of the removable cover sheet-protected layer. Any two adjacent layers can have 0, 1, or 2 removable cover sheets between them. After aligning the removable cover sheet-protected layers and just prior to forming the sandwich structure with the aligned removable cover sheet-protected layers, remove (e.g., pull out) the removable cover sheets from between the layers (like pulling sheets of paper out from between stacked books), and then contact together the resulting unprotected layers so as to form the sandwich structure. The cover sheets preferably have substantially the same length and width (i.e., facial dimensions) as layers of the invention laminate. The unprotected layers are functionally unharmed by the removal of their removable cover sheets. For example, in some embodiments the manufacturing method further comprises preliminary steps of independently providing protected forms of the first organic polymer layer, glass layer, first silane-containing polyolefin layer, each protected form respectively comprising a removable cover sheet in operative contact to at least one face of the first organic polymer layer, glass layer, or first silane-containing polyolefin layer; aligning the protected forms of the first organic polymer layer, glass layer, first silane-containing polyolefin layer; and then removing the removable cover sheets therefrom and contacting resulting unprotected forms of the first organic polymer layer, glass layer, or first silane-containing polyolefin layer together so as to form the three-layer sandwich structure. The present invention contemplates manufacturing any organic polymer-glass laminate or sealed glass laminate by this preferred manufacturing method.

One of the discoveries of the instant invention is that in some embodiments buckling of an invention laminate can occur during manufacturing thereof. In some instances the buckling ultimately causes no harm to the invention laminate. In other instances the buckling (e.g., warping) is severe enough that it can lead to cracking of the glass layer or sealed glass layer during manufacturing of the respective organic polymer-glass laminate or sealed glass laminate. This is especially possible when coefficients of linear thermal expansion (CLTE) of organic polymers at opposing faces of the glass layer or sealed glass layer are sufficiently different (have a difference of 0.00001 per degree Kelvin (0.00001/° K) or more) such that the organic polymers at the opposing faces exhibit different effects of extension, contraction, or both. Accordingly, the manufacturing method of the present invention preferably comprises employing one or more organic polymer(s) in adhering operative contact (direct or, in invention laminates having four or more layers, indirect via interposed organic polymer layers) with the first face of the glass layer (or sealed glass layer) and one or more organic polymer(s) in adhering operative contact (direct or indirect) with the second face of the glass layer (or sealed glass layer), each of the organic polymers independently being characterizable by a CLTE, at least one, preferably each, CLTE of the organic polymer(s) in adhering operative contact with the first face of the glass layer (or sealed glass layer) being less than 0.00001/° K from at least one, preferably each, CLTE of the organic polymer(s) in adhering operative contact with the second face of the glass layer (or sealed glass layer). The organic polymer(s) in adhering operative contact with the first face of the glass layer (or sealed glass layer) comprises the organic polymer of the first organic polymer layer and the organic polymer(s) in adhering operative contact with the second face of the glass layer (or sealed glass layer) comprises the silane-containing polyolefin of the first silane-containing polyolefin layer. The CLTEs are determined according to either ASTM D696-08 (Standard Test Method for Coefficient of Linear Thermal Expansion of Plastics between −30° C. and 30° C. With a Vitreous Silica Dilatometer) or ASTM E228-06 (Standard Test Method for Linear Thermal Expansion of Solid Materials With a Push-Rod Dilatometer). More preferably the method of inhibiting buckling reduces an average frequency from ten test runs of a form of buckling leading to cracking of the glass layer or sealed glass layer of the respective laminate by 20% or more (still more preferably 50% or more, and even more preferably 80% or more) compared to an average frequency from ten test runs of a method of manufacturing the respective laminate not employing the method of inhibiting buckling of the organic polymer-glass laminate or sealed glass laminate. For example, in some embodiments the manufacturing method further comprises applying the first organic polymer layer to the first face of the glass layer and applying the first silane-containing polyolefin layer to the second face of the glass layer so as to form a three-layer sandwich structure; and laminating the three-layer sandwich structure under laminating conditions so as to form the organic polymer-glass laminate, each of the organic polymer and silane-containing polyolefin independently being characterizable by a CLTE, the CLTE of the organic polymer being less than 0.00001 per degree Kelvin from the CLTE of the silane-containing polyolefin. The present invention contemplates manufacturing any organic polymer-glass laminate or sealed glass laminate by this preferred manufacturing method.

Preferably during a lamination process to manufacture the organic polymer-glass laminate or sealed glass laminate, the alkoxysilane groups in the silane-containing polyolefin and silanol groups in the glass layer, which silanol groups naturally occur at each of the first and second faces of the glass layer, undergo a non-catalyzed condensation reaction that forms siloxane linkages between the glass layer and the first and second silane-containing polyolefin layers (as distinct from the aforementioned cross-linked siloxane linkages). More preferably each direct adhering operative contact to the glass layer by the first and second silane-containing polyolefin layers independently is characterizable by an adhering strength of 2 N/mm or greater, the adhering strength being measured using a 180 degree peel test conducted at a loading rate of 2 inches (51 millimeters) per minute with the organic polymer-glass laminate being at a relative humidity of 50%, a temperature of 24 degrees Celsius. Typically the 180 degree peel test is performed at ambient pressure (e.g., 101 kilopascals).

Turning to performance of the invention laminates, preferably each of the organic polymer-glass laminate, sealed glass laminate, and functional laminate independently is characterizable by passing the simulated hail impact test based on standard IEC 1262; a water vapor transmission rate through the organic polymer-glass laminate of less than 0.0004 g/m$^2$/day; and an oxygen gas transmission rate through the organic polymer-glass laminate of less than 0.0001 cm$^3$/(m$^2$*day*bar). Preferably the water vapor transmission rate through the functional laminate, sealed glass laminate, or organic polymer-glass composite laminate independently is less than 0.0001 g/m$^2$/day, more preferably less than 0.00005 g/m$^2$/day. Preferably the oxygen gas transmission rate through the functional laminate, sealed glass laminate, or organic polymer-glass composite laminate independently is less than 0.00001 cm$^3$/(m$^2$*day*bar), and more preferably less than 0.000005 cm$^3$/(m$^2$*day*bar).

Preferably the light transmittance through the organic polymer-glass laminate, sealed glass laminate, and functional laminate independently is at least 85 percent, and more preferably at least 90% of an incident light through the functional laminate, the incident light being characterizable as having a wavelength of from 380 nanometers to 1200 nanometers.

Preferably the organic polymer-glass laminate, sealed glass laminate, and functional laminate independently is characterizable by increased toughness, flexibility, or more preferably both toughness and flexibility. Toughness and flexibility can be independently determined by any suitable means. Preferably the toughness is characterizable by average extension in millimeters (mm) and average load in kilograms (kg) as measured using a two-point bending test conducted as described later herein. In some embodiments the invention laminates are characterized as having an average extension of 77 mm or greater, more preferably 89 mm or greater, and still more preferably 100 mm or greater. In some embodiments the invention laminates are characterized as having an average extension of 200 mm or less, and in other embodiments of 140 mm or less. In some embodiments the invention laminates are characterized as having an average load of 0.17 kg or greater, more preferably 0.23 kg or greater, and still more preferably 0.87 kg or greater. In some embodiments the invention laminates are characterized as having an average load of 1.5 kg or less, and in other embodiments of 1.2 kg or less. In some embodiments the invention laminates are characterized as having a combination of average extension and average load, each being any one of the aforementioned preferred average extension and average load values, respectively. Preferably the flexibility is characterizable as an average measured or calculated bending curvature in millimeters from extension at break using the two-point bending test conducted as described later herein. In some embodiments, the invention laminates are characterizable as having a measured or calculated average bending curvature, and preferably both measured and calculated average bending curvature of 500 mm or less, and preferably 200 mm or less. Preferably the bending curvature is measured. In some embodiments the bending curvature is calculated. In some embodiments the invention laminates are characterizable as having a calculated average bending curvature of 110 mm or less, more preferably 85 mm or less, still more preferably 75 mm or less, even more preferably 65 mm or less, and yet more preferably of 55 mm or less (e.g., 49 mm or less). Still more preferably the invention laminates are characterizable as being tough and flexible in such a way so as to be characterizable by a combination of any one of the aforementioned preferred average extensions; any one of the aforementioned preferred average loads; and any one of the aforementioned preferred average bending curvatures. Remarkably, the still more preferred invention laminates are characterizable as passing the simulated hail impact test based on standard IEC 1262 and at the same time having the aforementioned combination of toughness and flexibility.

Turning to devices incorporating the invention laminates, the invention laminates are especially useful for being incorporated into and protecting electronic or optical devices, especially from mechanical damage and oxygen and water degradation. Examples of such electronic devices are LEDs and PV cell containing electronic devices. Examples of such optical devices are photonic integrated circuits and digital optical networking systems containing same. Any one or more of the organic polymer-glass laminate, sealed glass laminate, and functional laminate can be used for this purpose.

A preferred electronic device comprising the invention composite material is the LED. A more preferred electronic device comprising the invention composite material is the PV device. A PV device comprises a material that is operable for converting solar radiation into direct current electricity. A PV device comprises a PV cell (commonly known as a solar cell), and still more preferably an array or assembly of PV cells. The array or assembly still more preferably comprises a PV module (commonly known as a solar panel). Because preferred invention laminates are characterizable as being flexible and tough (e.g., as indicated by results of a two-point bending test, which is described later), they are especially well-suited for use with thin-film PV cells or modules. Preferably the PV cell comprises a thin-film semiconductor-based PV cell. More preferably the PV cell comprises an amorphous silicon PV cell; polycrystalline silicon PV cell; microcrystalline silicon PV cell; or a chalcogenide-based photovoltaic cell. The term "chalcogenide-based photovoltaic cell" means a material that is operable for converting solar radiation into direct current electricity, the material comprising at least one of sulfur, selenium, tellurium, and polonium; preferably at least one of sulfur, selenium, and tellurium; and more preferably at least one of selenium and tellurium. A preferred chalcogenide-based photovoltaic cell is a cadmium telluride PV cell; or, still more preferably, a copper indium gallium selenide (CIGS; also known as copper indium gallium diselenide) thin-film PV cell. Preferably the electronic or optical comprises a flexible PV device comprising at least one photovoltaic cell and the invention laminate, the photovoltaic cell having a light incident side, the invention laminate being located on the light incident side of the photovoltaic cell in such a way that the photovoltaic cell is protected (as described herein) from mechanical damage, water vapor and oxygen gas by the invention laminate. More preferably each of the at least one photovoltaic cell of the flexible PV device independently is a chalcogenide-based photovoltaic cell. As used herein, the term "flexible" as applied in the flexible PV device means capable of being bent once around a 1-meter diameter cylinder (as far as length of the flexible PV device or circumference of the 1-meter diameter cylinder, whichever is shorter, allows) and being returned to an unbent condition without fracturing or experiencing a substantial decrease in performance (e.g., water vapor and oxygen gas permeation resistance). A substantial decrease in performance means a fall off to a performance value that is not a performance value described herein for the invention.

Turning to manufacturing the electronic or optical devices comprising one or more of the invention laminates, the electronic or optical devices can be manufactured by adapting relevant known methods. For example, PV modules comprising arrays of PV cells comprising the invention composite material can be manufactured by adapting a method of U.S. Pat. No. 6,586,271 or U.S. Pat. No. 6,114,046. In some embodiments the present invention also provides a method of manufacturing a photovoltaic cell having two substantially planar surfaces, one of the two substantially planar surfaces being characterizable as sun-faceable (i.e., light incident) and the other as earth-faceable, the method comprising securing the invention laminate adjacent and parallel to the sun-faceable planar surface of the photovoltaic cell. Preferably the method further comprises securing a back skin layer to the earth-faceable planar surface of the photovoltaic cell. Each securing step independently can be any relevant known securing method such as urging the PV cell, invention laminate, and, optionally, the back skin layer, against a frame dimensioned for receiving them. Another method comprises laminating together the PV cell, invention laminate, and, optionally, the back skin layer. The back skin layer and frame independently can be comprised of any suitable weatherable solid material such as, for example, aluminum, polyfluoroethylene-coated steel, glass, titanium, polyethylene, and polypropylene. Preferably at least one of the back skin material and frame material at least has preferred water barrier properties.

Materials and General Methods

Flexible glass sheets: Corning 0211 glass, 2 mils (50 μm) thick (Corning Incorporated, Rochester, N.Y., USA); or Schott D263T glass, 4 mils (100 μm) thick.

Silane-containing Polyolefin 1 (SC-PO-1): Silane-grafted olefin block copolymer comprising 1 wt % alkoxysilane Z6030 (Dow Corning, Midland, Mich., USA) grafted via a reactive extrusion process to INFUSE™ D9500.00 resin, density 0.877 g/mL, and melt index 5 (The Dow Chemical Company). Thickness of film layer(s) prepared with SC-PO-1 is 4 mils (100 μm) unless noted otherwise.

Silane-containing Polyolefin 2 (SC-PO-2): Silane-grafted cyclic olefin block copolymer comprising 1.5 wt % vinyltrimethoxysilane (VTMS, Dow Corning, Midland, Mich., USA) grafted via a reactive extrusion process to ENGAGE™ 8200 resin (The Dow Chemical Company). Thickness of film layer(s) prepared with SC-PO-2 is 3 mils (75 μm) unless noted otherwise.

Silane-containing Polyolefin 3 (SC-PO-3): Silane-grafted cyclic olefin block copolymer comprising 1.5 wt % vinyltrimethoxysilane (Dow Corning, Midland, Mich., USA) grafted via a reactive extrusion process to ENGAGE™ 8200 resin (The Dow Chemical Company). Thickness of film layer(s) prepared with SC-PO-3 is 15 mils (375 μm) unless noted otherwise.

Poly(ethylene terephthalate) (PET-1) film—MELINEX® (Imperial Chemical Industries PLC, London, England) polyester film, thickness 125 μm.

Polymethyl methacrylate (PMMA-1) film, thickness 50 μm; made from Arkema PLEXIGLAS® (Rohm & Haas Company, Philadelphia, Pa., USA) DR Impact modified General Purpose Acrylic Resin.

Poly(ethylene-co-tetrafluoroethylene) (ETFE-1) film from Asahi Chemical Company, Limited (of Asahi Kasei Chemicals of Asahi Kasei Corporation, Tokyo, Japan), Lot number 83N1240000.

Cyclic block copolymer, Thickness 1 (CBC-T1): CBC-T1 film is melt cast from a polymer manufactured by fully hydrogenating anionic polymerized styrene and 1,3-butadiene block copolymer using a porous silica supported catalyst. The resulting material is a pentablock copolymer with a pre-hydrogenation styrene content of 70 wt % and 1,3-butadiene content of 30 wt %; a pre-hydrogenation number average molecular weight (Mn) of 75,000 grams per mole (g/mol); a pre-hydrogenation 1,2-vinyl content of 8 wt %; a glass transition temperature T of 135° C.; and an elongation of 20%. Thickness of film layer(s) prepared with CBC-T1 is 3 mils (75 μm) unless noted otherwise.

Cyclic block copolymer, Thickness 2 (CBC-T2): CBC-T2 film is prepared from the same material used to make the CBC-T1 film. Thickness of film layer(s) prepared with CBC-T2 is 6 mils (150 μm) unless noted otherwise.

180 Degree Peel Test

For purposes of this invention the 180 degree peel test is conducted at ambient pressure (e.g., 101 kPa) as described here to measure adhesion strength. Provide a test laminate. Measure width of the test laminate. Load the test laminate into an Instron machine 5581 at a loading rate of 2 inches (51 mm) per minute. Conduct the test at 24° C. and 50% relative humidity. Stop the test after a stable peel region is observed (typically after loading about 2 inches of test laminate). Determine peel load. Repeat 4 times. Report adhesion strength as a width-normalized average of the 5 runs of ratio of peel load to test laminate width, expressed in Newtons per millimeter.

Water Vapor and Oxygen Gas Permeation Testing Procedures

Oxygen gas ($O_2$) transport: $O_2$ transport across the invention composite material is conducted on a Mocon Ox-Tran® 2/21 oxygen transmission rate testing instrument (MOCON, Inc., Minneapolis, Minn., USA). A sample is a 10 cm×10 cm×0.05 cm compression molded plaque, which has spaced-apart entrance and exit faces that, when used in the Mocon Ox-Tran® 2/21, lack fluid communication with each other except through the plaque. Temperature of the Mocon Ox-Tran® 2/21 is set to 24° C. and barometric pressure is about 760 mmHg (101 kPa). The testing procedure employs a hydrous gas mixture (feed gas) and a carrier gas (2 mol % hydrogen in nitrogen), which transports downstream permeant gas (i.e., gas that has diffused through the plaque) away from the exit face of the plaque. Relative humidity of the hydrous gas and the carrier gas is about 50% each. The downstream permeant gas comprises oxygen that has moved through the plaque. Oxygen permeability is reported in terms of volume in cubic centimeters ($cm^3$) of oxygen gas at standard pressure (1.0 bar, i.e., 101 kPa) and temperature (24° C.) that can pass through a plaque that is 1 mil (0.001 inch, 0.0254 millimeter) thick and 1 square meter ($m^2$) in surface area in 1 day at 1 bar (100 kPa) pressure (i.e., $cm^3/(m^2*day*bar)$).

Water vapor transport: samples previously tested in the $O_2$ transport experiments are transferred to a Mocon Permatran-W® 700 moisture vapor transmission rate testing instrument (MOCON, Inc.) comprising a water sensor. Water vapor transport experiments are conducted at 24° C., 760 mmHg barometric pressure (101 kPa), and 100% relative humidity. A carrier gas is 100% dry (i.e., anhydrous) nitrogen gas and a hydrous gas mixture (i.e., test gas) comprises water vapor in air. The hydrous gas mixture is generated from a wet sponge disposed near the entrance face of the plaque. The carrier gas sweeps any water vapor that has permeated through the plaque away from the exit face of the plaque to the sensor. Water vapor permeability is reported in terms of the grams of water vapor that can pass through and plaque that is 1 mil thick and 1 $m^2$ in surface area in 1 day ($g/m^2/day$).

Simulated Hail Impact Test Based on Standard IEC 1262

Drop a golf ball (Callaway, Big Bertha) having a weight of 45 g onto 11 different locations on a test object, each drop being from a height of 4.5 meters (m). This test simulates hail test conditions for PV modules where hail particles are assumed to be 25 millimeters (mm) in diameter and traveling at a speed of 23 meters per second (m/s).

Toughness and Flexibility as Measured with a Two-Point Bending Test

For purposes of this invention the two-point bending test is conducted at ambient pressure (e.g., 101 kPa) as described here to measure toughness and flexibility of a laminate sample. Obtain 5 test laminates from the laminate sample. Test laminate size is 6 inches (15 cm)×10 inches (25 cm). An Instron machine 5581 is used for the test with the grip to grip distance of 8 inches (20 cm). Prior to testing, condition the test laminates by subjecting them to a temperature of 24° C. and 50% relative humidity for 2 days. Load a test laminate at a loading rate of 2 inches (51 mm) per minute. Repeat testing run 4 times with the 4 other conditioned test laminates. Use extension at break measurement from the two-point bending test as the measure of toughness, where extension at break is determined when, during the test, a first crack in the test laminate occurs and stress relaxation is observed from a loading extension curve. Give toughness measurement for the laminate sample as an average extension in millimeters and average load in kilograms from the 5 the test runs for the laminate sample.

Use bending curvature, measured or calculated as the minimum bending curvature prior to the aforementioned fracture of samples in the two-point bending test, to characterize flexibility of the laminate sample. As toughness and flexibility of a test laminate increases such that it can be bent into a curvature having an increasingly shorter bend radius, the bending curvature decreases. The test set up for the two-point bending test is shown in Scheme 1 below:

Scheme 1:

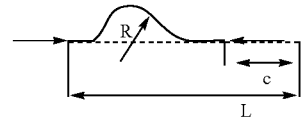

In Scheme 1, dotted line represents position and length of test laminate prior to bending. Solid curved line represents position of test laminate at maximum curvature just prior to fracture thereof. L is original length of test laminate, c is distance one end of test laminate moves during a run and just prior to fracture (break), and R is bending curvature. Bending curvature, R, can be measured directly during the test, or calculated using the formula:

$$R = H/2\epsilon \text{ (i.e., } R \text{ equals } H \text{ divided by (2 times } \epsilon\text{))}$$

wherein R is the bending curvature, H is the thickness of laminate, and ε is the strain. Give flexibility calculated as an average bending curvature in millimeters from the 5 the test runs for the laminate sample.

COMPARATIVE EXAMPLE(S)
(NON-INVENTION)

Comparative Example(s) are provided herein as a contrast to certain embodiments of the present invention and are not meant to be construed as being either prior art or representative of non-invention examples.

Comparative Example 1 (CE-1)

Simulated Hail Impact Test of Corning 0211 Glass Sheet

The Corning 0211 glass sheet fails a simulated hail impact test conducted by dropping a steel ball having a diameter of 17 millimeters (mm) onto it from a height of less than 0.5 foot (<15 cm).

Comparative Example 2 (CE-2)

Simulated Hail Impact Test of Schott D263T Glass Sheet (Schott Glass)

The Schott D263T glass sheet is flexible but not tough as characterized by the two-point bending test and fails a simulated hail impact test based on standard IEC 1262. Results are reported later in Table 1.

Comparative Example 3 (CE-3)

SC-PO-2-Schott D263T Glass Laminate (SC-PO-2/Schott glass)

Apply a 3 mils (75 μm) thick layer of SC-PO-2 (described previously) to one face of a 4 mils (100 μm) thick Schott D263T glass sheet to give a 2-layer sandwich structure. Laminate the 2-layer sandwich structure by degassing it for 5 minutes, heating the degassed sandwich structure to 170° C., subjecting the resulting heated sandwich structure to a reduced pressure of 50 kPa (gauge pressure) for 5 minutes, and then returning the resulting depressurized sandwich structure to 101 kPa for 10 minutes, and allowing the resulting 2-layer SC-PO-2-Schott D263T glass laminate to cool to room temperature. The SC-PO-2-Schott D263T glass laminate fails a simulated hail impact test based on standard IEC 1262. Result is reported later in Table 1.

Non-limiting examples of the present invention are described below that illustrate some specific embodiments and aforementioned advantages of the present invention. Preferred embodiments of the present invention incorporate one limitation, and more preferably any two, limitations of the Examples, which limitations thereby serve as a basis for amending claims.

EXAMPLE(S) OF THE PRESENT INVENTION

Example 1 (EX-1)

A 4-Layer Organic Polymer-Glass Laminate (ETFE-1/SC-PO-1/Corning Glass/SC-PO-1)

Apply a 4 mils (100 μm) thick layer of SC-PO-1 (described previously) to each face of a 2 mils (50 μm) thick Corning 0211 glass sheet, then apply a 2 mils (50 μm) thick layer of the ETFE-1 to one of the layers of SC-PO-1 to give a 4-layer sandwich structure. Prior to applying the layers, the layers are protected by removable cover sheets consisting of standard white laser printer paper, which removable cover sheets are removed (i.e., pulled out) just prior to lamination. Laminate the 4-layer sandwich structure by degassing it for 5 minutes, heating the degassed sandwich structure to 150° C., subjecting the resulting heated sandwich structure to a reduced pressure of 50 kPa (gauge pressure) for 2 minutes, and then returning the resulting depressurized sandwich structure to 101 kPa for 10 minutes, and allowing the resulting 4-layer organic polymer-glass laminate (having a total thickness of 12 mils (300 μm)) of Example 1 to cool to room temperature. After 48 hours at room temperature, the 4-layer organic polymer-glass laminate passes (does not crack) a simulated hail impact test conducted by dropping a steel ball having a diameter of 17 mm onto it (contacting the ETFE-1 layer) from a height of greater than 2 feet (>61 cm).

Example 2 (EX-2)

A 3-Layer Organic Polymer-Glass Laminate (SC-PO-2/Schott Glass/SC-PO-2)

Apply a 3 mils (75 μm) thick layer of SC-PO-2 (described previously) to each face of a 4 mils (100 μm) thick Schott D263T glass sheet to give a 3-layer sandwich structure. Prior to applying the layers, the layers are protected by removable cover sheets consisting of standard white laser printer paper, which removable cover sheets are removed (i.e., pulled out) just prior to lamination. Laminate the 3-layer sandwich structure degassing it for 5 minutes, heating the degassed sandwich structure to 170° C., subjecting the resulting heated sandwich structure to a reduced pressure of 50 kPa (gauge pressure) for 5 minutes, and then returning the resulting depressurized sandwich structure to 101 kPa for 10 minutes, and allowing the resulting 3-layer organic polymer-glass laminate (having a total thickness of 10 mils (250 μm)) of Example 2 to cool to room temperature. The 3-layer organic polymer-glass laminate is tough and flexible as characterized by the two-point bending test and passes a simulated hail impact test based on standard IEC 1262. Results are reported later in Table 1.

Example 3 (EX-3)

A 3-Layer Organic Polymer-Glass Laminate (SC-PO-2/Schott Glass/SC-PO-2)

Repeat the procedure and tests of Example 2 except apply a 15 mils (375 μm; instead of the 3 mils thickness of Example 2) thick layer of SC-PO-2 (described previously) to each face of a 4 mils (100 μm) thick Schott D263T glass sheet to give a new 3-layer sandwich structure. The resulting 3-layer organic polymer-glass laminate (having a total thickness of 34 mils (850 μm)) is tough and flexible as characterized by the two-point bending test and passes a simulated hail impact test based on standard IEC 1262. Results are reported later in Table 1.

Example 4 (EX-4)

A 5-Layer Organic Polymer-Glass Laminate (CBC-T1/SC-PO-2/Schott Glass/SC-PO-2/CBC-T1)

Repeat the procedure and tests of Example 2 except further apply a 2 mils (50 μm) thick layer of CBC-T1 (described previously) to an outer face of each of the SC-PO-2 (described previously) layer to give a 5-layer sandwich structure instead of the 3-layer structure. The resulting 5-layer organic polymer-glass laminate (having a total thickness of 14 mils (350 μm)) is tough and flexible as characterized by the two-point bending test and passes a simulated hail impact test based on standard IEC 1262. Results are reported later in Table 1.

Example 5 (EX-5)

An Edge-Encapsulated 5-Layer Organic Polymer-Glass Laminate (CBC-T2/SC-PO-2/Schott Glass/SC-PO-2/CBC-T2)

Repeat the procedure and tests of Example 2 except further apply a 6 mils (150 μm) thick layer of CBC-T2 (described previously) to an outer face of each of the SC-PO-2 (described previously) layer and to edges of the SC-PO-2 and Schott D263T glass sheet to give a 5-layer sandwich structure instead of the 3-layer structure. The resulting edge-encapsulated S-layer organic polymer-glass laminate (having a total thickness of 22 mils (550 μm)) is tough and flexible as characterized by the two-point bending test and passes a simulated hail impact test based on standard IEC 1262. Results are reported later in Table 1.

Example 6 (EX-6)

A 5-Layer Organic Polymer-Glass Laminate (PET-1/SC-PO-2/Schott Glass/SC-PO-2/PET-1)

Repeat the procedure and tests of Example 2 except further apply a 5 mils (125 μm) thick layer of PET-1 (described previously) to an outer face of each of the SC-PO-2 (described previously) layer, but not to edges, to give a 5-layer sandwich structure instead of the 3-layer structure. The resulting 5-layer organic polymer-glass laminate (having a total thickness of 20 mils (500 μm)) is tough and flexible as characterized by the two-point bending test and passes a simulated hail impact test based on standard IEC 1262. Results are reported later in Table 1.

Example 7 (EX-7)

An Edge-Encapsulated 5-Layer Organic Polymer-Glass Laminate (PET-1/SC-PO-2/Schott Glass/SC-PO-2/PET-1)

Repeat the procedure and tests of Example 6 except further apply some PET-1 to edges of the 5-layer sandwich structure. The resulting edge-encapsulated 5-layer organic polymer-glass laminate (having a total thickness of 20 mils (500 μm)) is tough and flexible as characterized by the two-point bending test and passes a simulated hail impact test based on standard IEC 1262. Results are reported later in Table 1.

Example 8 (EX-8)

A 5-Layer Organic Polymer-Glass Laminate (PMMA-1/SC-PO-2/Schott Glass/SC-PO-2/PMMA-1)

Repeat the procedure and tests of Example 2 except further apply a 2 mils (50 μm) thick layer of PMMA-1 (described previously) to an outer face of each of the SC-PO-2 (described previously) layer to give a 5-layer sandwich structure instead of the 3-layer structure. The resulting 5-layer organic polymer-glass laminate (having a total thickness of 14 mils (350 μm)) is tough and flexible as characterized by the two-point bending test and passes a simulated hail impact test based on standard IEC 1262. Results are reported below in Table 1.

TABLE 1 results of two-point bending toughness and flexibility tests and simulated hail impact test IEC 1262

| Test Sample No. | Laminate layers | Toughness - average extension (mm) | Toughness - average load (kg) | Simulated hail impact IEC 1262 | Flexibility - Calculated Bending curvature (average, mm) |
| --- | --- | --- | --- | --- | --- |
| CE-2 | Schott glass | 66 | 0.113 | Fails | 101.6 |
| CE-3 | SC-PO-2/Schott glass | Not tested | Not tested | Fails | Not tested |
| EX-1 | ETFE-1/SC-PO-1/Corning glass/SC-PO-1 | Not tested | Not tested | Passes | Not tested |
| EX-2 | SC-PO-2/Schott glass/SC-PO-2 | 91 | 0.128 | Passes | 65 |
| EX-3 | SC-PO-2/Schott glass/SC-PO-2 | 77 | 0.177 | Passes | 81.28 |
| EX-4 | CBC-T1/SC-PO-2/Schott glass/SC-PO-2/CBC-T1 | 116 | 0.25 | Passes | 50.8 |
| EX-5 | Edge protected CBC-T2/SC-PO-2/Schott glass/SC-PO-2/CBC-T2 | 137 | 0.78 | Passes | 48.8 |
| EX-6 | PET-1/SC-PO-2/Schott glass/SC-PO-2/PET-1 | 89 | 0.877 | Passes | 71.1 |
| EX-7 | Edge protected PET-1/SC-PO-2/Schott glass/SC-PO-2/PET-1 | 138 | 1.13 | Passes | 47.8 |
| EX-8 | PMMA-1/SC-PO-2/Schott glass/SC-PO-2/PMMA-1 | 100 | 0.235 | Passes | 60.1 |

Example 9 (EX-9)

A 3-Layer Organic Polymer-Glass Laminate (SC-PO-3/Schott Glass/SC-PO-3)

Repeat the procedure and tests of Example 2 except apply a 3 mils (75 μm) thick layer of SC-PO-3 (described previously, instead of SC-PO-2) to each face of a 4 mils (100 μm) thick Schott D263T glass sheet to give a new 3-layer sandwich structure. The 3-layer organic polymer-glass laminate (having a total thickness of 10 mils (250 μm)) is tough and flexible as characterized by the two-point bending test.

Example 10 (EX-10)

A 5-Layer Sealed Glass Laminate (ETFE-1/CBC-T1/Sealed Schott Glass/CBC-T1/ETFE-1)

Apply a 3 mils (75 μm) thick layer of SC-PO-2 (described previously) to each face of a 4 mils (100 μm) thick Schott D263T glass sheet to give a 3-layer sandwich structure. Remove excess SC-PO-2 from the faces of the Schott D263T glass sheet by wiping with a cloth, thereby giving the Schott D263T glass sheet having microscopic apertures sealed with residual SC-PO-2. Apply a 4 mils (100 μm) thick layer of CBC-T1 (described previously) to each face of the resulting wiped Schott D263T glass sheet to give a 3-layer sandwich structure. Apply a 2 mils (50 μm) thick layer of the ETFE-1 to outer faces of the 3-layer sandwich structure to give a 5-layer sandwich structure. Laminate the 5-layer sandwich structure degassing it for 5 minutes, heating the degassed sandwich structure to 170° C., subjecting the resulting heated sandwich structure to a reduced pressure of 50 kPa (gauge pressure) for 5 minutes, and then returning the resulting depressurized sandwich structure to 101 kPa for 10 minutes, and allowing the resulting 5-layer organic polymer-glass laminate (having a total thickness of 16 mils (400 μm)) of Example 9 to cool to room temperature. The 5-layer organic polymer-glass laminate is tough and flexible as characterized by the two-point bending test and passes a simulated hail impact test based on standard IEC 1262.

Example 11 (EX-11)

Adhering Strength Test and Water Vapor and Oxygen Gas Transmission Rates of the Invention Laminates of Examples 1 to 10

Perform the 180 degree peel test described previously. Each of the invention laminates of Examples 1 to 10 is characterizable as having an adhering strength of 2 N/mm or greater.

Perform the water vapor and oxygen gas permeation tests described previously. Each of the invention laminates of Examples 1 to 10 is characterizable as having a water vapor transmission rate through the organic polymer-glass laminate of less than 0.0004 g/m$^2$/day and an oxygen gas transmission rate through the organic polymer-glass laminate of less than 0.0001 cm$^3$/(m$^2$*day*bar).

Example 12 (EX-12)

Finite Elements Analysis (FEA) Modeling Derived Invention Laminate

Conduct FEA modeling using computer software ABAQUS™ version 6.7-1 (Abaqus, Inc., Pawtucket, R.I., USA) by SIMULIA™ (Dassault Systemes, Suresnes, France) to generate modeling data and identify an especially preferred invention laminate comprising, sequentially, the first silane-containing polyolefin layer having a thickness of from 1 mil (25 μm) to 3 mils (75 μm); the glass layer having a thickness of from 3 mils (75 μm) to 5 mils (125 μm); and the first organic polymer layer that is a second silane-containing polyolefin layer having a thickness of from 3 mils (75 μm) to 15 mils (375 μm). This invention laminate (having a total thickness of from 7 mils (175 μm) to 23 mils (575 μm)) is illustrated by the idealized drawing of in FIG. 1. The invention laminate is characterizable as having an adhering strength of 2 N/mm or greater and as being tough and flexible as characterized by the two-point bending test. It passes a simulated hail impact test based on standard IEC 1262.

As shown by the Examples, the invention advantageously provides, among other things, laminates and articles comprising same. The invention laminates include the aforementioned organic polymer-glass laminate, sealed glass laminate, and functional laminate. The invention laminates have a long-sought combination of increased resistance to mechanical damage, increased toughness and flexibility, and increased resistance to water and oxygen permeation. Not shown by data, the invention laminates of the Examples preferably also have at least one improved property of: increased light transmittance, weatherability, self-cleaning capability, thermal stability, resistance to oxidation, scratch and mar resistance, and interlayer adhesiveness. The improved properties of the invention laminates makes them especially useful for protecting articles sensitive to mechanical damage and water- or oxygen-based degradation. Thus the invention laminates are useful for increasing mechanical damage resistance and inhibiting water- and oxygen-based degradation of articles heretofore lacking or having inferior forms of such protection.

While the invention has been described above according to its preferred embodiments, it can be modified within the spirit and scope of this disclosure. This application is therefore intended to cover any variations, uses, or adaptations of the instant invention using the general principles disclosed herein. Further, the instant application is intended to cover such departures from the present disclosure as come within the known or customary practice in the art to which this invention pertains and which fall within the limits of the following claims.

What is claimed is:

1. An organic polymer-glass laminate comprising, sequentially, a first organic polymer layer, a glass layer, and a first silane-containing polyolefin layer, the glass layer having spaced-apart opposing first and second faces, the first and second faces being spaced-apart by a distance of from 25 micrometers to 500 micrometers; the first organic polymer layer being in direct adhering operative contact to the first face of the glass layer and the first silane-containing polyolefin layer being in direct adhering operative contact to the second face of the glass layer; the organic polymer-glass laminate being characterizable by passing a simulated hail impact test based on standard IEC 1262; and at least one of a water vapor transmission rate through the organic polymer-glass laminate of less than 0.0004 grams of water vapor per square meter of an exposed surface area of the organic polymer-glass laminate per day and an oxygen gas transmission rate through the organic polymer-glass laminate of less than 0.0001 cubic centimeters of oxygen gas per (square meter of the exposed surface area, day, bar (cm$^3$/(m$^2$*day*bar)) wherein (a) the first organic polymer layer comprises a protecting layer or reinforcing layer, the protecting layer or reinforcing layer comprising a material other than a silane-containing polyolefin and/or (b) the organic polymer-glass laminate further comprising a second organic polymer layer, the second organic polymer layer comprising a protecting layer or reinforcing layer and being in direct adhering operative contact to the first organic polymer layer or first silane-containing polyolefin layer.

2. The organic polymer-glass laminate as in claim 1, the first organic polymer layer comprising a second silane-containing polyolefin layer, the second silane-containing polyolefin layer being in direct adhering operative contact to the first face of the glass layer, the organic polymer-glass laminate thereby comprising, sequentially, the second silane-containing polyolefin layer, glass layer, and first silane-containing polyolefin layer.

3. The organic polymer-glass laminate as in claim 2, each direct adhering operative contact to the glass layer by the first and second silane-containing polyolefin layers independently being characterizable by an adhering strength of 2 Newtons per millimeter or greater, the adhering strength being measured using a 180 degree peel test conducted at a loading rate of 2 inches (51 millimeters) per minute with the organic polymer-glass laminate being at a relative humidity of 50 percent and a temperature of 24 degrees Celsius.

4. The organic polymer-glass laminate as in claim 1, the protecting layer comprising a fluoropolymer, silicone, poly(ethylene terephthalate), poly(ethylene naphthalate), polycarbonate, cyclic block copolymer polyolefin, amorphous polyolefin, polymethylmethacrylate, aliphatic thermoplastic polyurethane, aliphatic polyimide, or a blend of two or more thereof.

5. The organic polymer-glass laminate as in claim 1, the organic polymer-glass laminate further comprising a third organic polymer layer, the third organic polymer layer comprising a protecting layer or reinforcing layer and being in direct adhering operative contact to the first silane-containing polyolefin layer and the second organic polymer layer comprising a protecting layer or reinforcing layer and being in direct adhering operative contact to the first organic polymer layer.

6. The organic polymer-glass laminate as in claim 1, the organic polymer-glass laminate being characterizable by a total thickness of from 75 micrometers to 1500 micrometers.

7. The organic polymer-glass laminate as in claim 1, the organic polymer-glass laminate being characterizable by a light transmittance of at least 80 percent of an incident light through the organic polymer-glass laminate, the incident light being characterizable as having a wavelength of from 380 nanometers to 1200 nanometers.

8. The organic polymer-glass laminate as in claim 1, the organic polymer-glass laminate being characterizable as having both the water vapor transmission rate and the oxygen gas transmission rate and being further characterizable as tough and flexible as determined by a two-point bending test, the toughness being characterizable by average extension in millimeters (mm) and average load in kilograms (kg) as measured using the two-point bending test wherein the average extension is 77 mm or greater and the average load is 0.17 kg or greater; the flexibility being characterizable as an average measured or calculated bending curvature in millimeters from extension at break using the two-point bending test, wherein the measured or calculated average bending curvature is 500 millimeters or less.

9. The organic polymer-glass laminate as in claim 1, the first organic polymer layer being a second silane-containing polyolefin layer and having a thickness of from 75 micrometers to 375 micrometers and the first silane-containing polyolefin layer having a thickness of from 25 micrometers to 75 micrometers.

10. An electronic or optical device comprising the laminate as in claim 1.

11. The electronic or optical device as in claim 10 wherein the device is flexible and comprises at least one photovoltaic cell, the photovoltaic cell having a light incident side, the laminate being located on the light incident side of the at least one photovoltaic cell in such a way that the photovoltaic cell is protected from mechanical damage, water vapor and oxygen gas by the laminate.

12. The electronic or optical device as in claim 11, wherein each of the at least one photovoltaic cell of the flexible photovoltaic device independently is a chalcogenide-based photovoltaic cell.

13. A method of manufacturing the organic polymer-glass laminate as in claim 1, the method comprising: applying the first organic polymer layer to the first face of the glass layer and applying the first silane-containing polyolefin layer to the second face of the glass layer so as to form a three-layer sandwich structure; and laminating the three-layer sandwich structure under laminating conditions so as to form the organic polymer-glass laminate, each of the organic polymer and silane-containing polyolefin independently being characterizable by a coefficient of linear thermal expansion, the coefficient of linear thermal expansion of the organic polymer being less than 0.00001 per degree Kelvin from the coefficient of linear thermal expansion of the silane-containing polyolefin.

14. A sealed glass laminate comprising at least two organic polymer layers and a sealed glass layer, the sealed glass layer comprising a glass having a plurality of microscopic structural defects substantially sealed with a silane-containing polyolefin against transmission of a vapor or gas therethrough, the sealed glass layer having a thickness of from 25 micrometers to 500 micrometers; the sealed glass laminate being characterizable by passing a simulated hail impact test based on standard IEC 1262 and both of a water vapor transmission rate through the sealed glass laminate of less than 0.0004 grams of water vapor per square meter of an exposed surface area of the glass per day and an oxygen gas transmission rate through the sealed glass laminate of less than 0.0001 cubic centimeters of oxygen gas per (square meter of the exposed surface area, day, bar ($cm^3/(m^2*day*bar)$)).

* * * * *